March 17, 1959  R. L. LICH  2,877,719
RAILWAY VEHICLE STRUCTURE
Filed June 25, 1953  2 Sheets-Sheet 1

INVENTOR.
Richard L. Lich
BY Rodney Bedell
atty.

March 17, 1959 R. L. LICH 2,877,719
RAILWAY VEHICLE STRUCTURE
Filed June 25, 1953 2 Sheets-Sheet 2
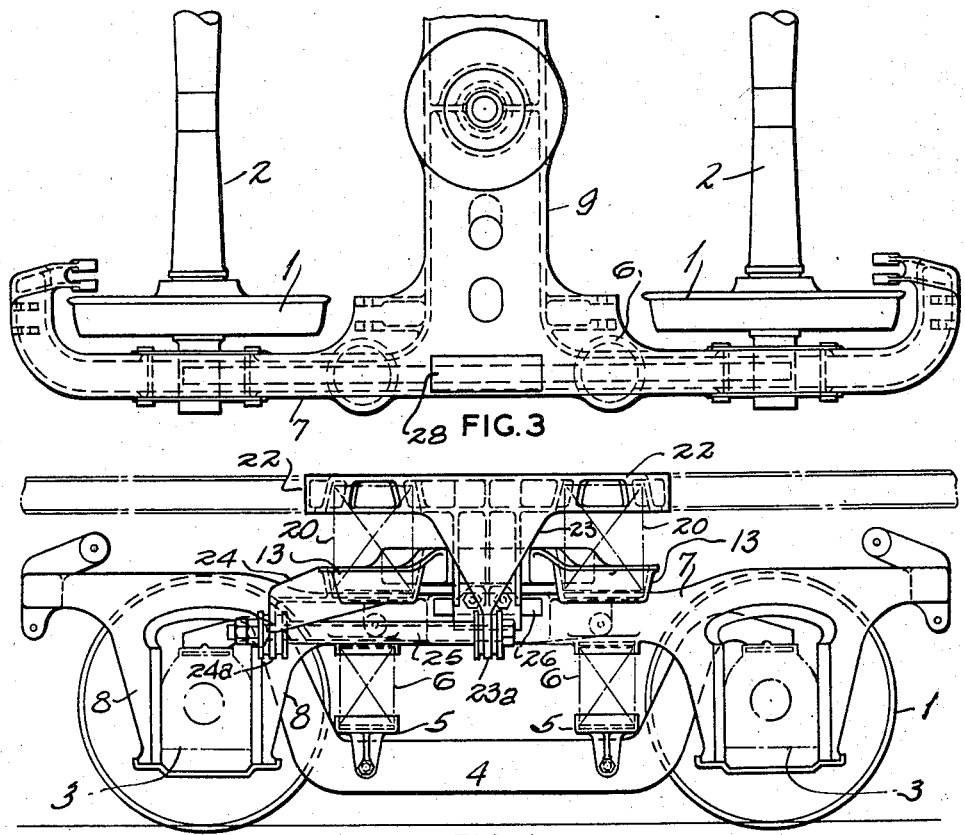
FIG. 3
FIG. 4
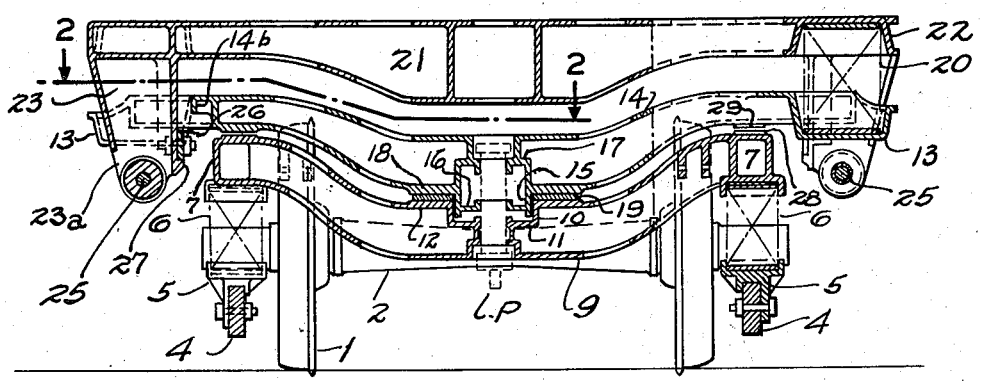
FIG. 5
INVENTOR.
Richard L. Lich
BY Rodney Bedell
atty.

United States Patent Office 2,877,719
Patented Mar. 17, 1959

2,877,719

RAILWAY VEHICLE STRUCTURE

Richard L. Lich, St. Louis, Mo., assignor to General Steel Castings Corporation, Granite City, Ill., a corporation of Delaware Application June 25, 1953, Serial No. 363,993

18 Claims. (Cl. 105—197)

The invention relates to railway rolling stock and more specifically to an arrangement for supporting a railway vehicle body on the vehicle running gear and the invention is particularly adapted for passenger carrying railway vehicles.

The main objects of the invention are to provide maximum lateral stability for the vehicle body, to cushion lateral and vertical shocks between the running gear and body, and to minimize tilting in a vertical longitudinal plane of those parts of the running gear which are positioned between the unsprung parts of the running gear and the vehicle body. The accomplishment of these main objects together with the following detail objects will provide maximum riding comfort of the passengers.

One more detail object of the invention is to provide a simple, light-weight, short wheel base, equalized truck and a mounting for the vehicle body, which will accommodate necessary swiveling of the truck on curved track and will permit the body to move transversely of the track relative to the truck to lessen shocks arising from forces applied laterally. This object is accomplished by a swiveling mounting of a rigid bolster on a simple rigid truck frame and supporting the vehicle body on the bolster by upright coil springs deflecting vertically and laterally, the bolster being held against swiveling relative to the body.

Another detail object of the invention is to provide stable support of the vehicle body. This is accomplished by extending the truck mounted bolster outwardly from the sides of the truck and providing a pair of body supporting spring units at each end of the bolster and spaced apart longitudinally of the vehicle.

Another object of the invention is to hold the vehicle body and truck against tilting transversely and longitudinally and to avoid shimmying of the truck. This is accomplished by using a central bearing between the truck frame and the bolster which extends radially outwardly from the axis of the swivel connection a sufficient distance to provide a non-rocking support of the bolster on the truck during all normal uses of the vehicle, and by having the bearing faces of sufficient area, and preferably unlubricated, for substantially preventing, by frictional resistance, swivel action between them except when positively induced by movement of the vehicle over curved track.

The features mentioned above reduces to a minimum (1) transmission of vibrations and shocks from the truck to the vehicle body, (2) lateral tilting of the body on the truck, (3) undesirable swiveling of running gear on straight track, and (4) short longitudinal forward and backward movements of body on the running gear. Such undesirable riding conditions often are due to ineffective cushioning of lateral and vertical movement between the running gear and body, to truck gallop, to truck shimmy or nosing, and to lateral tilting of body on the running gear.

A more specific detail object of the invention is to provide a truck supported bolster extending substantially from side to side of the vehicle body and having (1) structure on the bottom at its middle portion forming with the engaging portion of the truck a non-rocking swivel bearing, (2) a pair of upwardly facing body supporting spring receiving pockets in each of its end portions spaced apart longitudinally of the vehicle for stability, and (3) a bracket on each end portion for attaching one end of a longitudinally extending anchor between the bolster and vehicle body for holding the bolster against longitudinal movement relative to the body, but permitting lateral and vertical movement of bolster relative to the body by lateral and vertical deflections, respectively, of the body supporting springs.

Another more specific detail object of the invention is to provide a body underframe structure comprising a transversely extending member with its middle portion connecting at one side with the body center sills and connecting at its other side with the draft sills, the transverse member having a pair of longitudinally spaced supporting spring receiving pockets on the underside of each of its end portions and a downwardly extending bracket between each pair of pockets for attaching one end of a longitudinally extending anchor between the body and the bolster upon which the body supporting springs are mounted.

Other objects will be apparent to those skilled in the art from the following description and the accompanying drawings, in which:

Figure 3 is a top view of a longitudinal half of a truck upon which the bolster of Figure 2 is mounted.

Figure 4 is a side elevation of an assembled truck, including a bolster, and body underframe as shown in Figures 1, 2, and 3.

Figure 5 is a vertical transverse section through the assembled truck, intermediate bolster, and body underframe, the left hand portion of the section being taken on the line 5—5 of Figure 2 and the right hand portion of the section being taken on the line 5a—5a of Figure 2.

Figure 1:
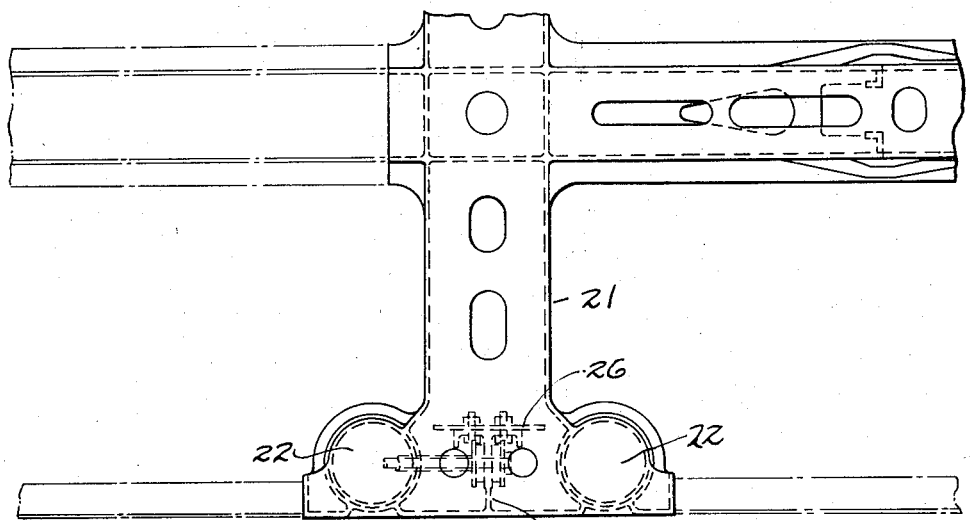
Figure 1 is a top view of the longitudinal half of a portion of a railway vehicle body underframe adjacent the body bolster and indicating portions of the draft sills, center sills, and a side sill.
Figure 2:
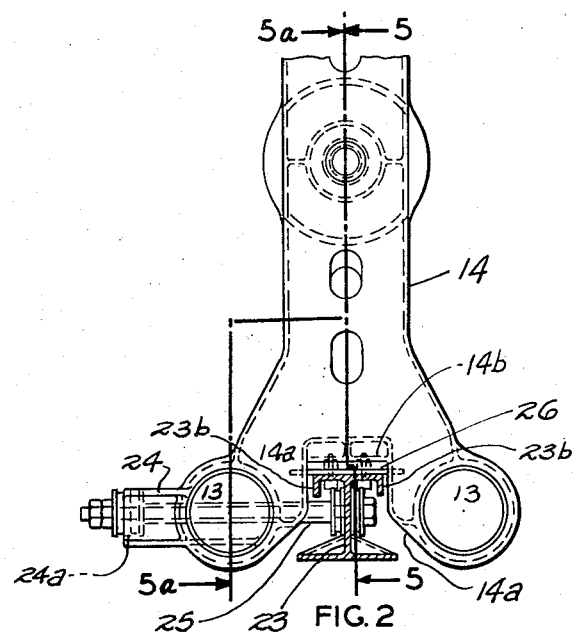
Figure 2 is a top view of one-half of a bolster member upon which the body underframe is supported and indicating adjacent portions of the under frame cut by the section line 2—2 of Figure 5.

The four wheel truck includes wheels 1 and axles 2, journal boxes 3, equalizers 4, equalizer spring seats 5, equalizer springs 6, and a truck frame having wheel pieces 7, pedestals 8, for slidingly receiving journal boxes 3, and a transom 9 between the wheel pieces. Preferably wheel pieces 7 and transom 9 are of box section to provide a strong, lightweight construction. The intermediate portion of transom 9 is depressed below the level of wheel pieces 7 and is provided with an upwardly facing central bearing comprising a central upright cylindrical web 10 and a horizontal web 11 at the bottom of the recess formed by web 10. Extending radially outwardly from part 10 and forming part of the top wall of transom 9 is an annular bearing 12 for carrying the truck load. An intermediate load-carrying bolster 14 extends transversely of the vehicle and its underside is provided with a central bearing structure including a downwardly projecting cylindrical part 15, a bottom horizontal web 16, and a top horizontal web 17. Extending radially outwardly from cylindrical part 15 and forming part of the bottom wall of the bolster is an annular bearing 18, rotatively mounted upon transom annular bearing 12, either directly or upon an intermediate liner 19 of any material which would provide desired frictional resistance to sliding action between its faces and the engaging faces of annular bearings 12 and 18. The liner may consist of brake lining material of a selected degree of hardness or it may consist of brass, bronze, stainless steel, etc. The bolster extends upwardly and outwardly from its central portion over and beyond wheel pieces 7 and terminates in upwardly facing spring seats 13.

Preferably the ends of bolster 14 are bifurcated and spring seats 13 are formed in the ends of the bifurcations and are spaced apart longitudinally of the vehicle a distance corresponding generally to the spacing of the equalizer springs 6. Spring seats 13 are positioned outboard of wheel pieces 7 and outboard of equalizer springs 6 but are in substantial alignment with the latter transversely of the truck. Upright coil springs 20 are mounted on bolster spring seats 13 and support the ends of the truck underframe cross member 21 which extends from side to side of the vehicle over bolster 14 but is spaced from the latter throughout the span between springs 20. The underframe spring seats, or caps 22, are recessed upwardly and bolster spring seats 13 are recessed downwardly so that springs of substantial height may be mounted on top of the bolster and support the vehicle underframe without unduly increasing the height of the underframe.

Depending from each side of the vehicle underframe between spring seats 22 is a bracket-like member 23 projecting downwardly through the bifurcation in bolster 14 and terminating in an upright flange 23a. Extending longitudinally of the vehicle from each end of bolster 14 is a bracket-like member 24 having a depending flange 24a at its outer end at the same level of and opposing, but spaced a substantial distance from, flange 23a on bracket 23. An elongated anchor 25 has its opposite end secured to flanges 23a and 24a, respectively. Anchor 25 is of well-known construction having yielding washers clamped against opposite sides of the flanges to which it is attached and accommodating relative vertical and lateral movement of the body underframe and bolster but holding them against substantial movement lengthwise of the vehicle.

Detachably secured to the lower portion of each bracket 23 is a bar 26 which rests upon a shear lug 27 and extends lengthwise of the vehicle beneath the adjacent bifurcations 14a and limit the vertical movement of the bolster and underframe away from each other, thus forming a safety device in the event of derailment.

Downwardly extending brackets 23 on the car body also include transversely and vertically extending flanges 23b spaced a short distance from the adjacent faces of bifurcations 14a and prevent excessive longitudinal displacement of the bolster relative to the underframe in the event of breakage or loosening of anchors 25.

Bolster 14 also includes a vertical flange 14b spaced from bracket 23 on the underframe. Flange 14b forms a stop for limiting lateral movement of the bolster relative to the underframe during lateral deflection of the body mounting springs 20.

The arrangement of widely spaced body mounting springs on the bolster, the central bearing between the truck and the bolster, and the spacing of the pairs of the body supporting springs at each end of the bolster longitudinally of the vehicle provide a non-rocking and laterally stable support for the vehicle body on the running gear and also a stable arrangement to prevent or resist relative tilting in a vertical longitudinal plane of the truck frame and bolster relative to the car body. These conditions, together with the frictional resistance of the annular bearings which form part of the central bearing, will reduce to a minimum amount any tendency for gallop of the truck, any shimmy or nosing action, or any longitudinal back and forth movements of the car body.

The bolster and transom are held against vertical separation by means of a locking center pin P, indicated in dot-dash lines, and the truck may swivel horizontally relative to the bolster and car body about the pin axis. The bolster is held against horizontal movement relative to the truck frame by internesting cylindrical portions 10 and 15 of the central bearing structures. The lower end of cylindrical portion 15 of the central bearing structure is spaced vertically from horizontal web 11 in the bottom of the recesses formed by cylindrical portion 10 in frame transom 9 and the entire truck load is transmitted to the truck frame transom through annular bearing 18 on the bolster, liner 19, and the annular bearing 12 on the transom.

Annular bearings 12 and 18 on truck transom 9 and bolster 14, respectively, extend radially outwardly from the axis of the central bearing structure sufficiently to provide a non-rocking support of the bolster and vehicle body on the truck, and no additional bearing supports such as the ordinary side bearings are required to hold the bolster or vehicle body against lateral tilting during normal uses of the vehicle. Safety stops 28, 29 on the truck frame and bolster, respectively, are normally spaced apart during all normal uses of the vehicle but are positioned close enough to each other to limit tilting of the bolster on the truck in the event of derailment or other unusual tilting conditions.

Details of construction of the underframe and running gear may be varied substantially without departing from the spirit of the invention and the exclusive use of those modifications coming within the scope of the claims is contemplated.

What is claimed is:

1. In a railway vehicle, truck structure comprising wheel and axle assemblies and a truck frame supported therefrom, an upwardly facing central bearing mounted directly on said frame equidistant from the sides thereof, a bolster mounted on said bearing to swivel about a vertical axis at the longitudinal center of the truck, said bolster being restrained against movement transversely of said frame, springs carried by said bolster, and a vehicle body mounted on said springs, transverse movement between said body and said bolster being accommodated by said springs.

2. A railway vehicle structure as described in claim 1 in which the body-supporting springs are flexible vertically and horizontally, there being means holding the bolster and body against substantial relative movement longitudinally of the vehicle while accommodating their substantial relative vertical movement and substantial relative movement transversely of the truck due to the yielding of the body-supporting springs.

3. A railway vehicle as described in claim 1 in which vehicle body supporting springs are spaced apart longitudinally of the vehicle at each end of the bolster, there being bracket structure depending from the vehicle body between the spaced supporting springs at each side of the vehicle, and means carried thereby and underlying the adjacent end portion of the bolster to positively limit movement of the body and bolster vertically away from each other.

4. In a railway vehicle, truck structure comprising wheel and axle assemblies and a rigid truck frame supported therefrom, a bolster mounted on said rigid truck frame to pivot about a fixed vertical axis on the longitudinal center line of the truck, said bolster being restrained against movement transversely of said frame, upright coil springs seated on said bolster and spaced transversely of the vehicle from said axis and yieldable vertically and transversely of the truck, and a vehicle body mounted directly on said springs, transverse movement between said body and said bolster being accommodated by said springs.

5. In a railway vehicle, truck structure comprising wheel and axle assemblies and a truck frame supported therefrom and including an upwardly facing central bearing in fixed relation to said assemblies transversely and lengthwise of the truck, a bolster mounted on said bearing to swivel about the vertical axis at the center of the bearing, said bolster being restrained against movement transversely of said frame, springs carried by the end portions of the bolster outboard of the wheels, a vehicle body mounted on said springs and having parts depending below the level of the bottom of said springs, and anchor members extending longitudinally of the vehicle beneath at least some of said springs, each having one end portion connected to one of said depending parts and the other end portion connected to the bolster, transverse movement between said body and said bolster being accommodated by said springs.

6. In a railway vehicle structure, a truck structure comprising wheel and axle assemblies and a truck frame supported therefrom and including an upwardly facing central bearing, a bolster mounted on said bearing to swivel about a vertical axis maintained at the longitudinal center of the truck, said bolster being restrained against movement transversely of said frame, springs carried by each end portion of the bolster and spaced apart longitudinally of the vehicle, a vehicle body mounted on said springs and having a part depending between said springs, and an anchor member extending longitudinally of the vehicle with one end portion connected to said depending part and the other end portion connected to the bolster, transverse movement between said body and said bolster being accommodated by said springs.

7. Railway vehicle structure as described in claim 6 in which the end portions of the bolster are bifurcated lengthwise of the bolster, with a body-supporting spring seated on each bifurcation, and the part depending from the body extends between the bifurcations, and the anchor is beneath at least one of the springs and inwardly from the outer portions of the spring seats.

8. In a railway vehicle, a truck including wheel and axle assemblies, equalizers extending between said assemblies, springs mounted on said equalizers and a rigid truck frame supported on said springs, a bolster supported directly on said frame to swivel horizontally relative thereon, said bolster being restrained against movement transversely of said frame, body-supporting springs carried on said bolster outboard of said equalizer springs, a body supported on said body-supporting springs, transverse movement between said body and said bolster being accommodated by said body-supporting springs.

9. In a railway vehicle, truck structure comprising wheel and axle assemblies and a truck frame supported therefrom and including wheel pieces and a rigid central bearing, means holding said central bearing equidistant from the sides of the truck, a bolster mounted on said rigid central bearing to swivel horizontally and extending transversely of the truck over said wheel pieces and beyond the same, springs mounted on the end portions of the bolster, and a vehicle body mounted on said springs and movable transversely of the truck by the lateral deflection of said springs.

10. In a railway vehicle structure, a truck comprising wheel and axle assemblies and a truck frame supported therefrom and including wheel pieces and a transverse member extending between and rigid with said wheel pieces with its middle portion depressed below the level of said wheel pieces and forming an upwardly facing central bearing, a bolster having a depressed middle portion pivotally supported upon said central bearing and extending upwardly and transversely of the vehicle over and beyond the wheel pieces, said bolster being restrained against movement transversely of said frame, the bolster end portions having downwardly recessed spring seats, upright coil springs carried on said spring seats, and a vehicle body including a transverse member mounted on said springs with its intermediate portion depending substantially below the level of the tops of said springs and into the depression in said bolster, transverse movement between said body and said bolster being accommodated by transverse yieldability of said coil springs.

11. Railway vehicle structure as described in claim 1 in which the body-supporting springs at each side of the vehicle are spaced apart longitudinally of the vehicle to provide a stabilizing effect between the bolster and the vehicle body tending to prevent unparallel relationship longitudinally between the bolster and the vehicle body, there being opposing safety stops on the truck and bolster spaced transversely of the vehicle outwardly from said central bearing and spaced vertically from each other to clear each other during all normal uses of the vehicle but positioned close enough to each other to limit tilting of the bolster on the truck in the event of derailment.

12. Railway vehicle structure as described in claim 1 in which equalizers extend between the wheel and axle assemblies and carry springs which support the truck frame, and the truck frame including a pair of spaced apart side members having pedestals for mounting said wheel and axle assemblies therein to hold said assemblies in longitudinal relation to each other but providing for relative vertical movement between the truck frame and said assemblies, and the frame also including a transversely extending member connected to said side members, the truck frame central bearing and the associated bolster comprising internesting center parts on said transverse member and said bolster with upright cylinder-like portions opposing each other to prevent movement horizontally relative to each other and including cooperating horizontal annular bearings on the transverse member and bolster facing upwardly and downwardly, respectively, and extending radially outwardly from said upright cylinder-like portions to form a non-rocking support of the bolster on the truck during all normal uses of the vehicle.

13. In a railway vehicle, a truck comprising wheel and axle assemblies and a rigid truck frame supported therefrom, a load-carrying bolster, means supporting the bolster on said frame and providing for swiveling of the bolster relative to the frame but holding the bolster against movement transversely of the frame, a vehicle body, and body mounting springs carried by the bolster and yieldable vertically and horizontally relative to the bolster, relative movement of the truck and body transversely of the vehicle being provided solely by deflection of said springs.

14. In a railway vehicle, truck structure comprising wheel and axle assemblies and truck framing supported therefrom, a bolster mounted on said framing to pivot about a vertical axis on the longitudinal center line of the truck, said bolster being restrained against movement transversely of said framing, upright springs seated on said bolster and spaced transversely of the vehicle from said axis and yieldable vertically and transversely of the truck, and a vehicle body mounted on said springs transverse movement between said body and said bolster being accommodated by said springs.

15. In a railway vehicle truck, spaced wheel and axle assemblies, springs supported therefrom, truck framing having wheel pieces mounted on said springs, a bolster mounted on said framing to pivot about a vertical axis on the longitudinal center line of the truck, said bolster being restrained against movement transversely of said framing, upright body support springs seated on said bolster outboard of the wheels and yieldable vertically and transversely of the truck to accommodate relative movement between said bolster and a body mounted on said body support springs.

16. A railway vehicle according to claim 14 in which means are provided for holding the bolster and the vehicle body against substantial relative movement longitudinally of the vehicle.

17. A railway vehicle according to claim 14 in which elongated anchors extend longitudinally of the vehicle with their ends secured to the bolster and vehicle body respectively, said anchors yielding transversely of their axes to accommodate the vertical and transverse yielding of the body mounting springs but holding the body and bolster against substantial movement lengthwise of the vehicle.

18. In a railway vehicle truck, spaced wheel and axle assemblies, truck framing supported therefrom, a bolster mounted on said framing to pivot about a vertical axis on the longitudinal center line of said framing, said bolster being restrained against movement transversely of said framing, upright body-support springs seated on said bolster and spaced transversely of the truck from said axis and yieldable vertically and transversely of the truck to accommodate relative transverse movement between said bolster and a vehicle body mounted on said body-support springs.

References Cited in the file of this patent

UNITED STATES PATENTS

| | | |
|---|---|---|
| 1,882,469 | Alden et al. | Oct. 11, 1932 |
| 1,921,913 | Drenning | Aug. 8, 1933 |
| 1,959,704 | Bugatti | May 22, 1934 |
| 1,978,206 | Kjolseth | Oct. 23, 1934 |
| 2,424,001 | Sheesley | July 15, 1947 |
| 2,440,746 | Hereford | May 4, 1948 |
| 2,600,704 | Traville et al. | June 17, 1952 |
| 2,636,451 | Watter | Apr. 28, 1953 |
| 2,680,413 | Becker | June 8, 1954 |
| 2,754,768 | Hile | July 17, 1956 |